United States Patent
Park

(10) Patent No.: US 10,662,858 B2
(45) Date of Patent: May 26, 2020

(54) HYBRID INTERCOOLER SYSTEM CAPABLE OF CONTROLLING OIL TEMPERATURE AND METHOD OF CONTROLLING THE SAME

(71) Applicant: Hyundai Motor Company, Seoul (KR)

(72) Inventor: Dang-Hee Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 387 days.

(21) Appl. No.: 15/340,482

(22) Filed: Nov. 1, 2016

(65) Prior Publication Data

US 2017/0335747 A1    Nov. 23, 2017

(30) Foreign Application Priority Data

May 17, 2016    (KR) .................. 10-2016-0060010

(51) Int. Cl.
*F01P 3/20* (2006.01)
*F16H 57/04* (2010.01)
*F01M 5/00* (2006.01)
*F01P 3/18* (2006.01)
(Continued)

(52) U.S. Cl.
CPC ............... *F01P 3/20* (2013.01); *F01M 5/005* (2013.01); *F01M 5/007* (2013.01); *F01P 3/18* (2013.01); *F01P 7/162* (2013.01); *F02B 29/0443* (2013.01); *F02B 29/0462* (2013.01); *F16H 57/0413* (2013.01); *F16H 57/0417* (2013.01); *F16H 57/0475* (2013.01); *F01P 2025/40* (2013.01); *F01P 2060/02* (2013.01); *F01P 2060/04* (2013.01); *F01P 2060/045* (2013.01); *F01P 2060/12* (2013.01); *Y02T 10/146* (2013.01)

(58) Field of Classification Search
CPC combination set(s) only.
See application file for complete search history.

(56) References Cited

U.S. PATENT DOCUMENTS

| | | | |
|---|---|---|---|
| 2002/0195090 A1 | 12/2002 | Marsh et al. | |
| 2003/0079728 A1 | 5/2003 | Marsh et al. | |
| 2012/0318163 A1* | 12/2012 | Ptacek | F01P 1/06 |
| | | | 105/26.05 |

FOREIGN PATENT DOCUMENTS

| | | |
|---|---|---|
| JP | 10-238347 A | 9/1998 |
| JP | H10238343 A | 9/1998 |
| JP | 2015-200239 A | 11/2015 |

(Continued)

*Primary Examiner* — Lindsay M Low
*Assistant Examiner* — Ruben Picon-Feliciano
(74) *Attorney, Agent, or Firm* — Mintz Levin Cohn Ferris Glovsky and Popeo, P.C.; Peter F. Corless

(57) ABSTRACT

A hybrid intercooler system is provided to adjust an oil temperature. The system includes an air cooling unit that exchanges heat with external air passing through outer surfaces of a plurality of compressed intake air channels and cools compressed intake air passing through interiors of the compressed intake air channels. A water cooling unit exchanges heat between engine cooling water enclosing the outer surfaces of the compressed intake air channels and the compressed intake air passing through the interiors of the compressed intake air channels and cools the compressed intake air. Additionally, an oil temperature controller exchanges heat between oil and the engine cooling water that is heated by the heat exchange performed by the water cooling unit and adjusts the temperature of the oil.

14 Claims, 9 Drawing Sheets

(51) Int. Cl.
*F01P 7/16* (2006.01)
*F02B 29/04* (2006.01)

(56) References Cited

FOREIGN PATENT DOCUMENTS

| | | |
|---|---|---|
| KR | 20-1995-0009398 Y1 | 10/1995 |
| KR | 10-1998-038566 A | 8/1998 |
| KR | 2004-0039736 A | 5/2004 |
| KR | 10-2011-0094948 A | 8/2011 |

* cited by examiner

HYBRID INTERCOOLER SYSTEM CAPABLE OF CONTROLLING OIL TEMPERATURE AND METHOD OF CONTROLLING THE SAME

CROSS-REFERENCE TO RELATED APPLICATIONS

This application claims priority to Korean Patent Application No. 10-2016-0060010, filed on May 17, 2016, which is incorporated herein by reference in its entirety.

BACKGROUND

Field of the Invention

The present disclosure relates to a hybrid intercooler system capable of adjusting an oil temperature and a method for operating the same; and, more particularly, to a hybrid intercooler system capable of implementing fast warm-up on initial start-up and adjusting the temperature of oil (engine oil or transmission oil) to maintain the temperature of the oil within the optimum range, and a method of operating the hybrid intercooler system.

Description of Related Art

Generally, a turbocharger has a supercharging structure in which, as the intake air to be supplied to an engine is compressed by discharge force of exhaust gas and then supplied into a cylinder, the intake air charge efficiency of the engine is enhanced and the mean effective pressure is increased thus enhancing the output of the engine. Such a turbocharger is typically configured with a compressor and a turbine disposed on a coaxial line, and the turbine is rotated by discharge force of exhaust gas discharged from an exhaust pipe to rotate the compressor that is disposed coaxial with the turbine, whereby air drawn through an intake manifold is compressed and supplied to the cylinder.

Meanwhile, air compressed by the above-mentioned turbocharger is increased in temperature. When the heated air is directly supplied to a combustion chamber, an increase ratio of air density is reduced. Consequently, the charge efficiency may be reduced, and knocking may be caused more easily. To reduce the temperature of the supercharged air, an intercooler is provided. FIG. 1 is a view illustrating a conventional intercooler according to the related art. Referring to FIG. 1, intake air cooled while passing through the intercooler is maintained in high-density and in a low-temperature state, thus enhancing the combustion power.

Intercoolers are typically classified into an air cooling type and a water cooling type according to a cooling method. The air cooling type intercooler is configured such that when supercharged air passes through a plurality of tubes, it is cooled by cold air passing through cooling fins that are integrally formed on the tubes. The water cooling type intercooler is configured such that supercharged air is cooled by a cooling channel coming into contact with the tubes. The conventional air cooling type intercooler has high cooling efficiency. However, it is difficult to stably maintain the cooling efficiency due to a change in temperature of external air, etc. Furthermore, the water cooling type intercooler may stably maintain the cooling efficiency but the cooling efficiency is low, compared to the air cooling type intercooler.

Meanwhile, on initial start-up of an engine, frictional resistance of a transmission is increased due to high viscosity of transmission oil. To minimize such frictional resistance, transmission oil is heated on the initial start-up to reduce the viscosity of the oil. An operation of rapidly heating the transmission oil on the initial start-up is referred to as fast warm-up. According to the related art, a separate automatic transmission fluid (ATF) warmer is provided. The ATF warmer is an apparatus configured to heat the transmission oil using engine cooling water heated to a high temperature. However, it is impossible to sufficiently heat the transmission oil until the engine cooling water is heated. Furthermore, due to the installation of the separate ATF warmer, the effort and cost of manufacturing the vehicle are increased.

In addition, when the transmission oil is excessively heated, the lubricant performance thereof is reduced, and the oil deteriorates in quality. Therefore, in the conventional vehicles, a separate oil cooler capable of cooling oil is required. The foregoing oil cooler may be installed in a radiator (refer to FIG. 3) or may be separately disposed in front of the radiator (refer to FIG. 4). The oil cooler is coupled with the transmission through separate hoses (an oil inlet hose and an oil outlet hose) to make it possible to exchange oil therebetween (refer to FIG. 2). However, the conventional art is problematic in that the effort and cost of manufacturing the vehicle are increased due to the installation of the separate oil cooler.

SUMMARY

An exemplary embodiment of the present disclosure provides to a hybrid intercooler integrally provided with an air cooling unit and a water cooling unit; and, particularly, to a hybrid intercooler system capable of implementing rapid warm-up of oil (e.g., engine oil or transmission oil) using waste heat of a water cooling unit on initial start-up and adjusting the temperature of the oil (e.g., the engine oil or transmission oil) during driving to maintain the temperature of the oil within the optimum range, and a method of operating the hybrid intercooler system.

Other objects and advantages of the present disclosure may be understood by the following description, and become apparent with reference to the exemplary embodiments of the present disclosure. Also, it is obvious to those skilled in the art to which the present disclosure pertains that the objects and advantages of the present disclosure can be realized by the means as claimed and combinations thereof.

In accordance with an exemplary embodiment of the present disclosure, a hybrid intercooler system capable of adjusting an oil temperature may include: an air cooling unit (100) configured to exchange heat with external air passing through outer surfaces of a plurality of compressed intake air channels (110) and cool compressed intake air passing through interiors of the compressed intake air channels (110); a water cooling unit (200) configured to exchange heat between engine cooling water enclosing the outer surfaces of the compressed intake air channels (110) and the compressed intake air passing through the interiors of the compressed intake air channels (110) and cool the compressed intake air; and an oil temperature controller (300) configured to exchange heat between oil and the engine cooling water heated by the heat exchange performed by the water cooling unit (200) and adjust the temperature of the oil.

The water cooling unit (200) may be disposed adjacent to an inlet of the compressed intake air channels (110). Additionally, the water cooling unit (200) may be disposed adjacent to an outlet of the compressed intake air channels (110). The water cooling unit (200) may include a cooling water tank (210) configured to enclose the compressed intake air channels (110) and a cooling water circulation pump (220) configured to supply cooled engine cooling water to the cooling water tank (210). The water cooling unit (200) may further include a cooling water inlet line (230) configured to supply engine cooling water to the cooling water tank (210) and a cooling water outlet line (240) configured to discharge heat-exchanged engine cooling water from the cooling water tank (210).

The oil temperature controller (300) may include an oil heat exchanger (310) disposed between the compressed intake air channels (110) and the cooling water tank (210) and configured to exchange heat between heated engine cooling water and oil. Additionally, the oil temperature controller (300) may include an oil inlet line (320) configured to supply oil to the oil heat exchanger (310) and an oil outlet line (330) configured to discharge heat-exchanged oil from the oil exchanger (310). The oil heat exchanger (310) may include a plurality of oil channels (311) configured to exchange heat between engine cooling water enclosing outer surfaces of the oil channels and oil passing through interiors of the oil channels.

Further, the oil heat exchanger (310) may include an oil inlet unit (312) that communicates with the oil inlet line (320) and configured to supply oil to the oil channels (311) and an oil outlet unit (313), that communicates with the oil outlet line (330), and through which oil that has passed through the oil channels (311) may be discharged. The oil channels (311) may be arranged parallel to each other, and the oil inlet unit (312) and the oil outlet unit (313) may communicate with the oil channels (311) such that flow rates of oil passing through the oil channels (311) are uniform with each other. The oil may be engine oil, and the oil inlet line (320) and the oil outlet line (330) may communicate with an engine. The oil may be transmission oil, and the oil inlet line (320) and the oil outlet line (330) may communicate with a transmission.

In accordance with an exemplary embodiment of the present disclosure, a method of controlling a hybrid intercooler system may include: measuring (S100) a temperature of oil in an oil outlet line (330) and a temperature of compressed intake air that has passed through a water cooling unit (200); determining (S200) whether the temperature of the oil exceeds a preset first reference temperature; determining (S300), when the temperature of the oil exceeds the preset first reference temperature, whether the temperature of the compressed intake air exceeds a preset second reference temperature; and operating (S400) a cooling water circulation pump (220) when the temperature of the compressed intake air exceeds the preset second reference temperature.

The method may further include: interrupting (S500) the operation of the cooling water circulation pump (220) when the temperature of the oil is less than the preset first reference temperature. In addition, when the temperature of the compressed intake air is less than the second reference temperature, the interruption operation (S500) may be performed.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
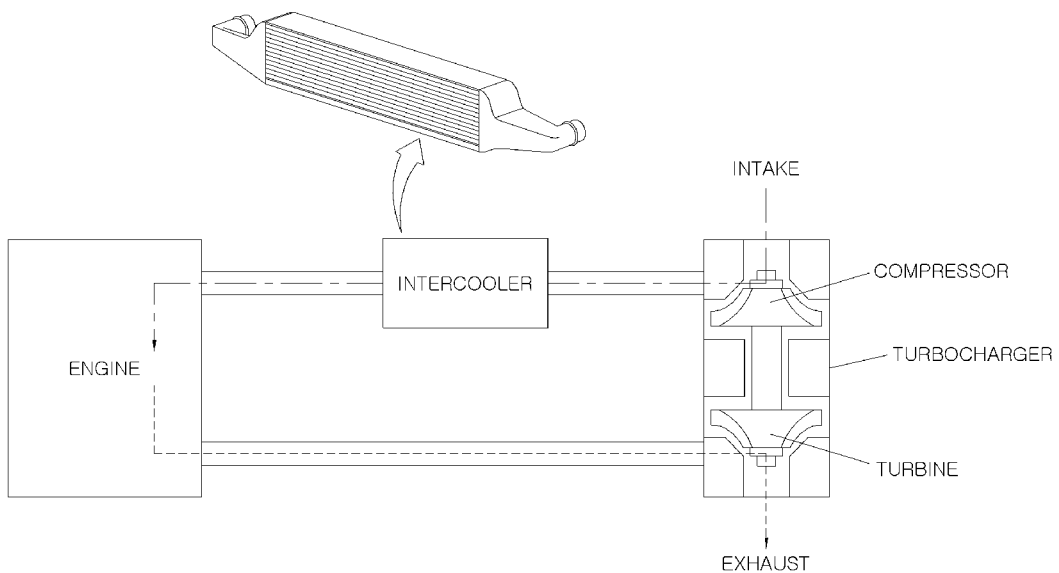
FIGS. 1 to 4 are views illustrating the problems of the related art.
Figure 2:
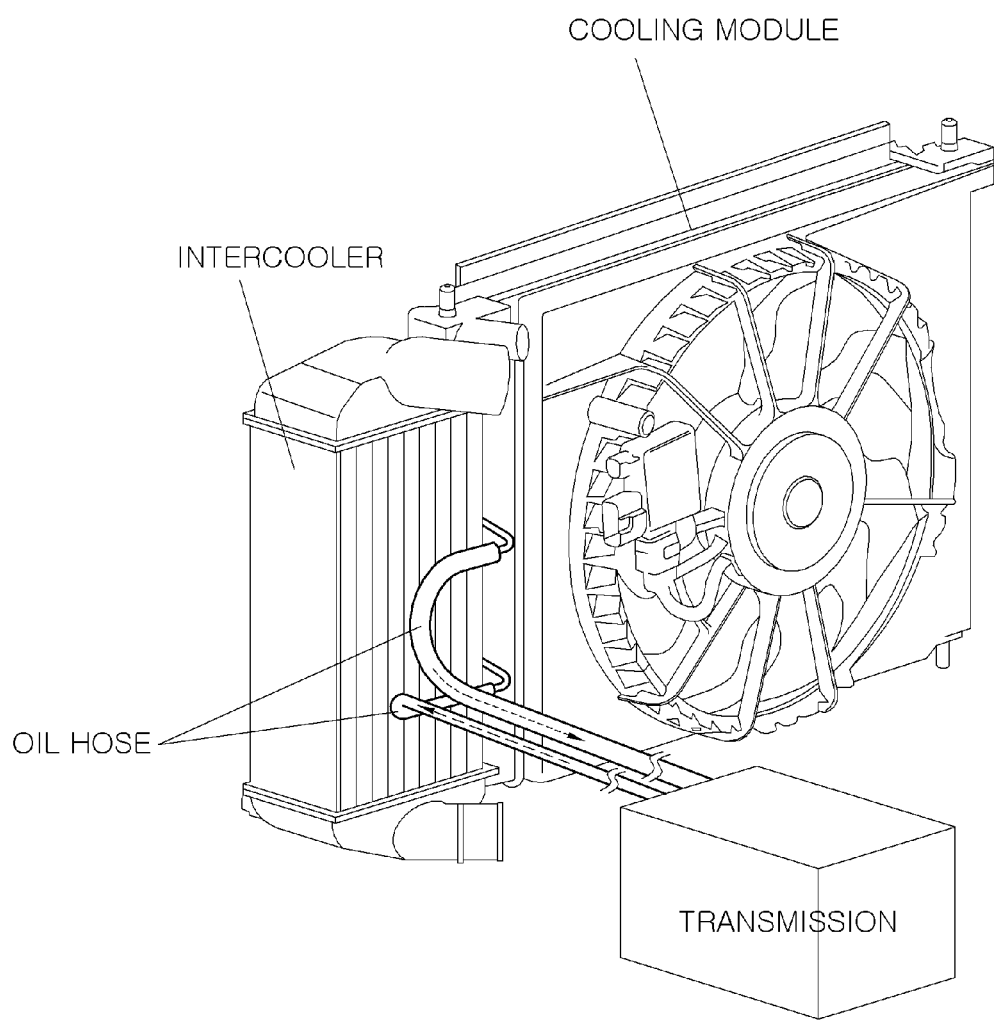
Figure 3:
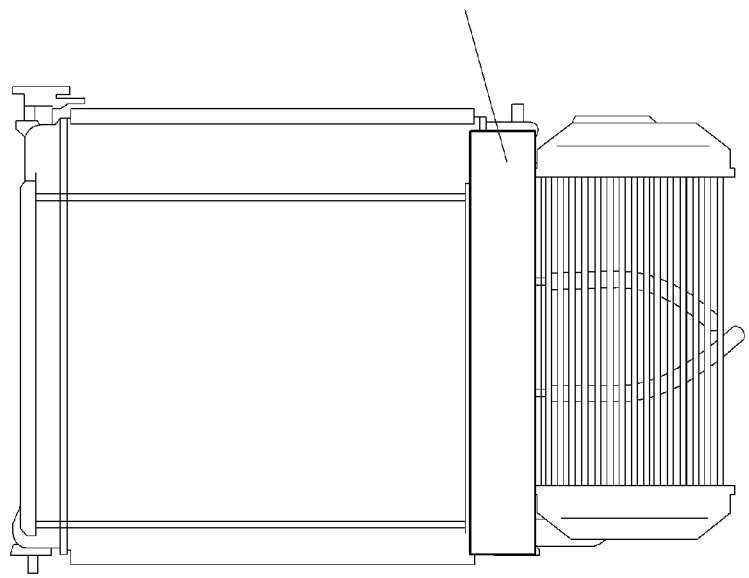
Figure 4:
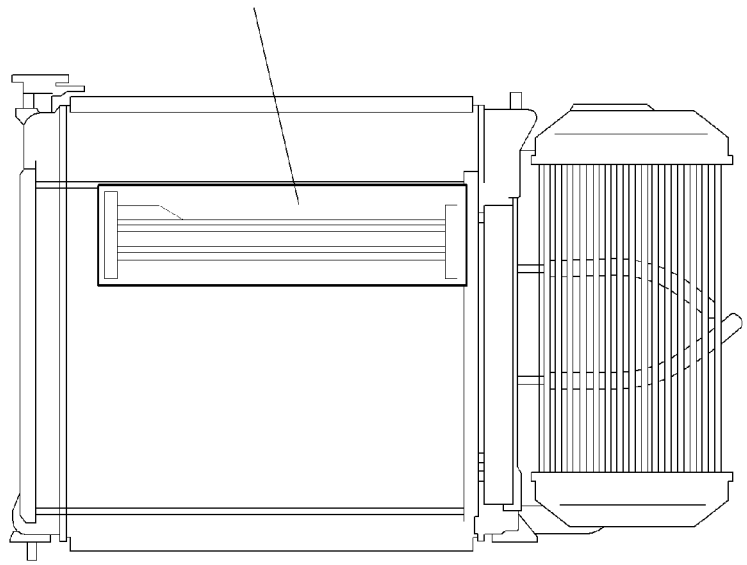

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The terms and words used in the specification and claims should not be limited to typical or dictionary meanings, but should be regarded as concepts selected by the inventor as concepts which best illustrate the present disclosure, and should be interpreted as having meanings and concepts adapted to the scope and spirit of the present disclosure to aid in understanding the technology of the present disclosure. Therefore, the description proposed herein is merely exemplary for the purpose of illustration only, and is not intended to limit the scope of the disclosure, so it should be understood that other equivalents and modifications could be made thereto without departing from the spirit and scope of the disclosure. In the following description of the present disclosure, detailed descriptions of known functions and components incorporated herein will be omitted when it may make the subject matter of the present disclosure unclear. Hereinafter, an exemplary embodiment of the present disclosure will be described in detail with reference to the attached drawings.

Figure 5:
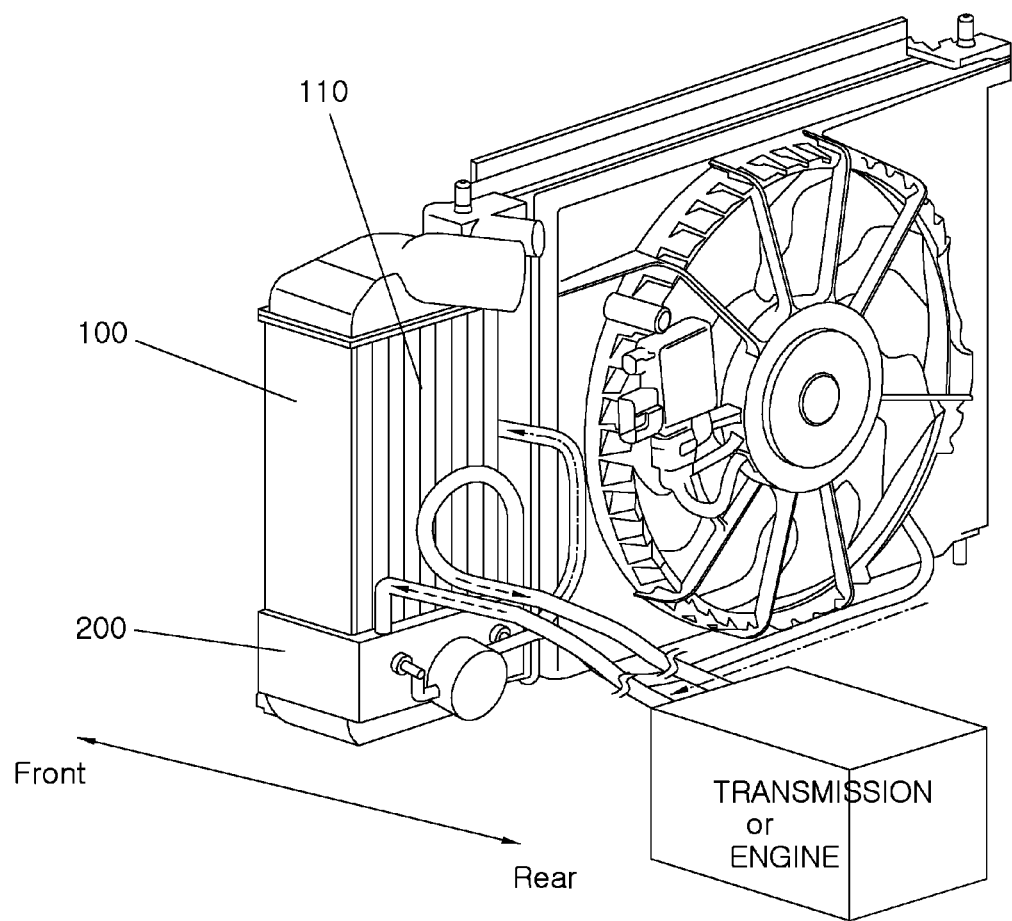
FIG. 5 is a rear perspective view of a hybrid intercooler system capable of controlling oil temperature according to an exemplary embodiment of the present disclosure.
Figure 6:
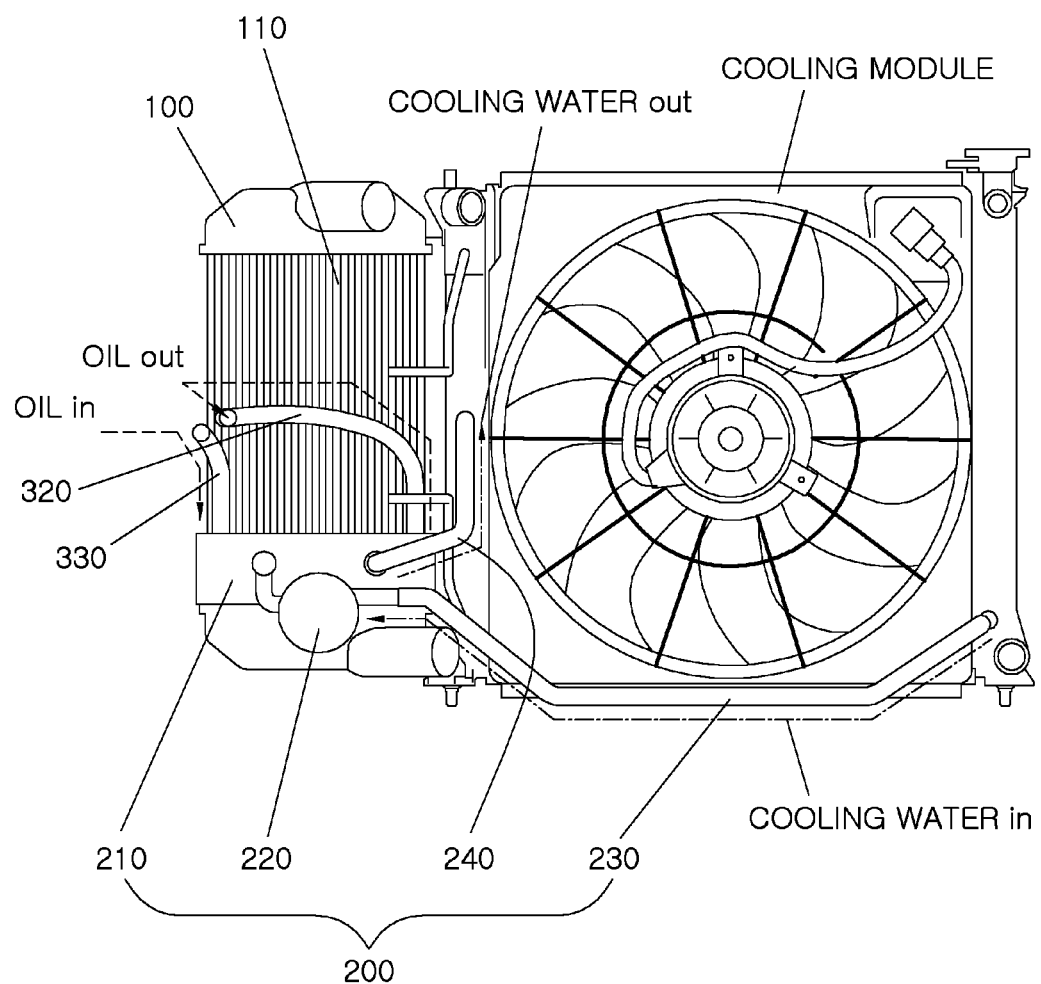
FIG. 6 is a rear view of the hybrid intercooler system capable of controlling the oil temperature according to an exemplary embodiment of the present disclosure.

FIG. 5 is a rear perspective view of a hybrid intercooler system capable of controlling oil temperature according to an exemplary embodiment of the present disclosure, and FIG. 6 is a rear view of the hybrid intercooler system capable of controlling the oil temperature according to an exemplary embodiment of the present disclosure. Referring to FIGS. 5 and 6, the hybrid intercooler system capable of controlling the oil temperature according to the present disclosure may include an air cooling unit 100, a water cooling unit 200 and an oil temperature controller 300. A general controller may be configured to operate the air cooling unit 100, the water cooling unit 200, and the oil temperature controller 300.

Particularly, the air cooling unit 100 may be configured to exchange heat with external air passing through the outer surfaces of a plurality of compressed intake air channels 110, to thus cool compressed intake air passing through the interior of the compressed intake air channels 110. The water cooling unit 200 may be configured to perform heat exchange between engine cooling water enclosing the outer surfaces of the compressed intake air channels 110 and compressed intake air passing through the compressed intake air channels 110, to thus cool the compressed intake air. Detailed configuration of the water cooling unit 200 will be described later herein.

The oil temperature controller 300 may be configured to perform heat exchange between oil and the engine cooling water heated by the heat exchange performed by the water cooling unit 200, to thus adjust the temperature of the oil. Detailed configuration of the oil temperature controller 300 will be described later herein. In the hybrid intercooler system capable of controlling the oil temperature, the water cooling unit 200 may be disposed adjacent to an inlet of the compressed intake air channels 110. In other words, the compressed intake air may be primarily cooled by the water cooling unit 200 and then secondarily cooled by the air cooling unit 100. Accordingly, temperature of the engine cooling water of the water cooling unit 200 may be rapidly increased to realize rapid warm-up, and the temperature of compressed intake air in the air cooling unit 100 may be maximally reduced.

Furthermore, in the hybrid intercooler system capable of controlling the oil temperature, the water cooling unit 200 may be disposed adjacent to an outlet of the compressed intake air channels 110. In other words, the compressed intake air may be primarily cooled by the air cooling unit 100 and then secondarily cooled by the water cooling unit 200. Accordingly, after compressed intake air is sufficiently cooled by the air cooling unit 100 having high cooling efficiency, the temperature of the compressed intake air may be adjusted to the optimum temperature by the water cooling unit 200.

Figure 7:
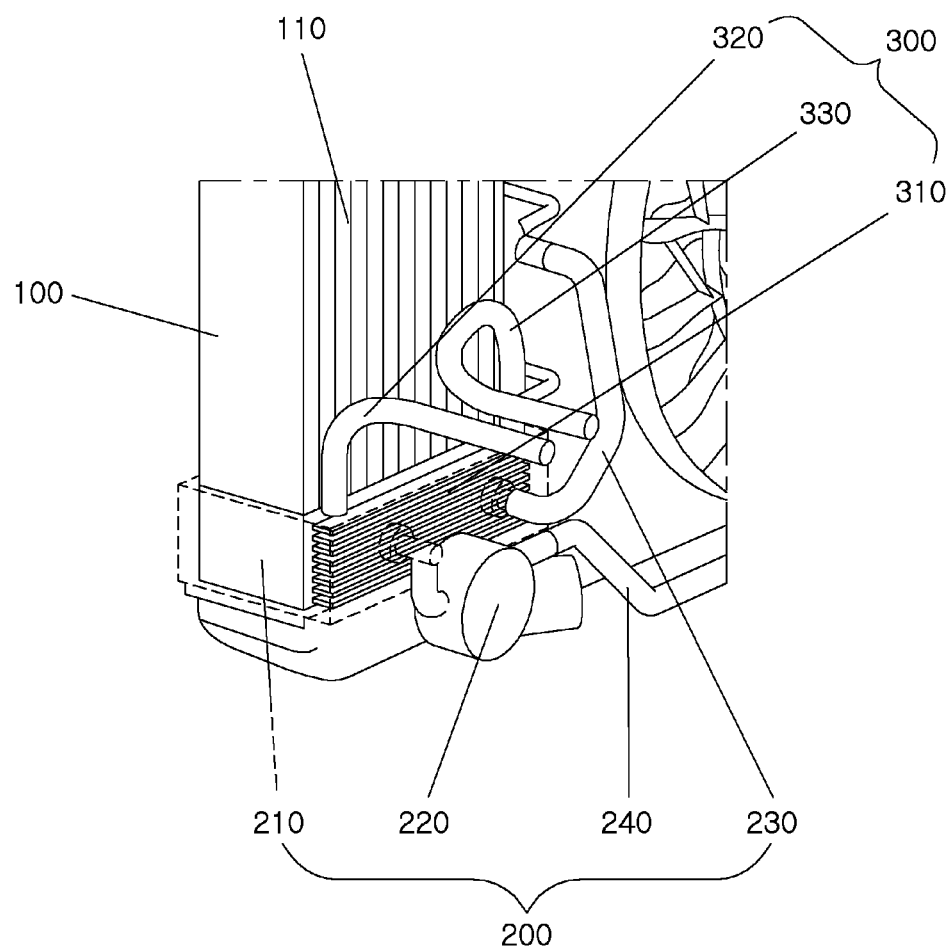
FIG. 7 is an enlarged view of a water cooling unit according to an exemplary embodiment of the present disclosure.

FIG. 7 is an enlarged view of the water cooling unit according to an exemplary embodiment of the present disclosure. Referring to FIG. 7, in the present disclosure, the water cooling unit 200 may include a cooling water tank 210, a cooling water circulation pump 220, a cooling water inlet line 230, and a cooling water outlet line 240. The cooling water tank 210 may have a shape that encloses the compressed intake air channels 110. The interior of the cooling water tank 210 may be filled with engine cooling water.

Further, the cooling water circulation pump 220 may be configured to supply cooled engine cooling water to the cooling water tank 210. The cooling water inlet line 230 is a line through which engine cooling water may be supplied to the cooling water tank 210. In other words, a portion of the engine cooling water that is cooled by and discharged from a radiator branches off from the engine cooling water and is drawn into the cooling water inlet line 230, and then may be pumped again by the cooling water circulation pump 220 and thus supplied into the cooling water tank 210. The cooling water outlet line 240 is a line through which engine cooling water heat-exchanged in the cooling water may be 210 is discharged. The engine cooling water may be drawn or suctioned into the engine or, alternatively, may be drawn into the radiator again.

Figure 8:
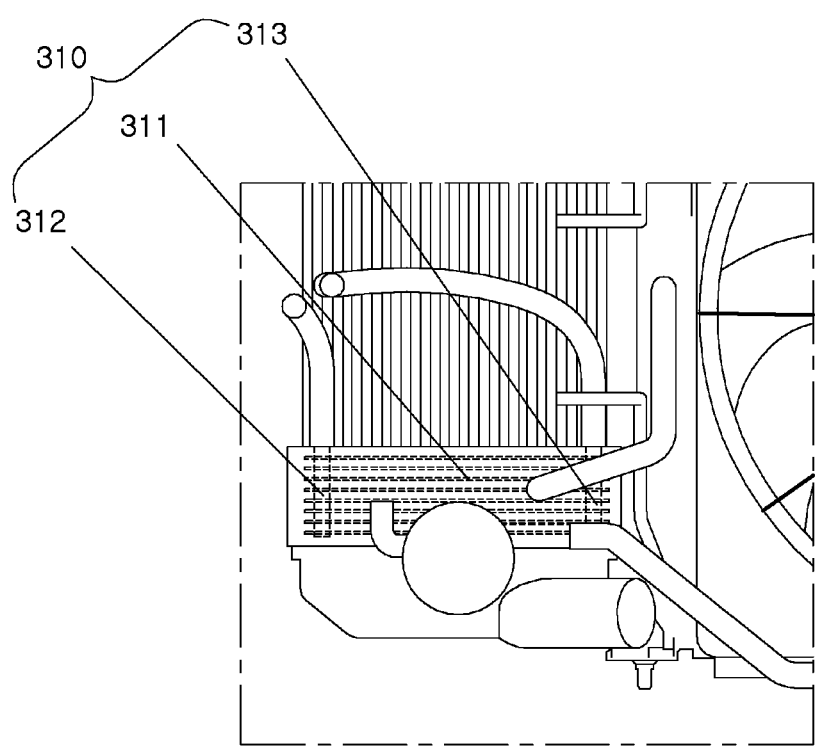
FIG. 8 is an enlarged view of an oil temperature controller according to an exemplary embodiment of the present disclosure.

FIG. 8 is an enlarged view of the oil temperature controller according to an exemplary embodiment of the present disclosure. Referring to FIG. 8, the oil temperature controller 300 according to the present disclosure may include an oil heat exchanger 310, an oil inlet line 320 through which oil is supplied to the oil heat exchanger 310, and an oil outlet line 330 through which heat-exchanged oil is discharged from the oil heat exchanger 310.

The oil heat exchanger 310 may be disposed between the compressed intake air channels 110 and the cooling water tank 210 and may be configured to perform heat exchange between heated engine cooling water and oil. The oil heat exchanger 310 may include a plurality of oil channels 311, an oil inlet unit 312 and an oil outlet unit 313. Additionally, heat exchange may be performed between engine cooling water enclosing the outer surfaces of the oil channels 311 and oil passing through the interior of the oil channels 311. In an exemplary embodiment, a plurality of oil channels 311 may be provided. The oil inlet unit 312 may communicate with the oil inlet line 320 and may be configured to supply oil to the oil channels 311. The oil outlet unit 313 may communicate with the oil outlet line 330 and oil that has passed through the oil channels 311 may be discharged there through.

Further, the oil channels 311 may be arranged parallel with each other. The oil inlet unit 312 and the oil outlet unit 313 may communicate with the oil channels 311 and thus, the flow rates of oil passing through the oil channels 311 are substantially uniform with each other. In particular, oil supplied to the oil heat exchanger 310 through the oil inlet line 320 may flow into the oil channels 311 through the oil inlet unit 312. The oil may be rapidly heated by heat exchange with the engine cooling water heated in the oil channels 311. The oil may pass through the oil discharge unit 313 and then may be discharged through the oil outlet line 330. In particular, the oil may be engine oil, and the oil inlet line 320 and the oil outlet line 330 may communicate with the engine. Alternatively, the oil may be transmission oil, and the oil inlet line 320 and the oil outlet line 330 may communicate with a transmission (refer to FIG. 5).

Hereinafter, the effects of the present disclosure will be described in detail. A conventional automatic transmission fluid (ATF) warmer executes a warm-up operation using engine cooling water heated by the engine. In such a conventional art, on initial start-up, the temperature of engine cooling water is room temperature and, particularly, on cold start-up, it may be a temperature below zero. Thus, a substantial amount of time is required to heat the engine cooling water. Typically, since the amount of engine cooling water is about 3 liters to 8 liters, considerable time is required to heat it.

Unlike this, in the present disclosure, the warm-up operation is performed using engine cooling water heated by compressed intake air in the water cooling unit 200. Although the temperature of compressed intake air is a temperature of about 160 degrees Celsius, the amount of engine cooling water in the water cooling unit 200 is comparatively small. Therefore, the warm-up operation may be completed more rapidly.

Furthermore, in the present disclosure, since heat may be transferred from oil (e.g., engine oil or transmission oil) to the engine cooling water in the water cooling unit 200, the hybrid intercooler system may also operate as an oil cooler. Particularly, in the conventional art, to prevent the transmission oil from being excessively cooled, a flow passage that communicates with the oil cooler is operated to be opened or closed by a separate valve or the like. However, in the present disclosure, such a separate valve or the like is omitted, and the temperature of oil may be maintained at an appropriate level by operating the cooling water circulation pump 220.

Figure 9:
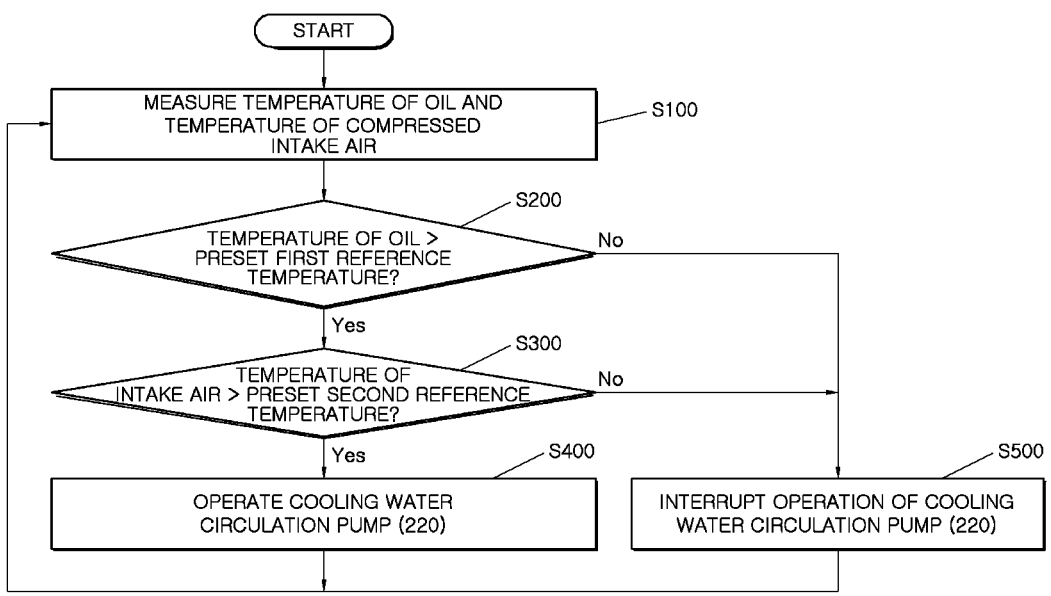
FIG. 9 is a flowchart of a method of controlling the hybrid intercooler capable of controlling the oil temperature according to an exemplary embodiment of the present disclosure.

FIG. 9 is a flowchart of a method of controlling the hybrid intercooler capable of controlling the oil temperature according to an exemplary embodiment of the present disclosure. Referring to FIG. 9, the method of controlling the hybrid intercooler capable of controlling the oil temperature according to the present disclosure may include: measuring the temperature of oil in the oil outlet line 330 and the temperature of compressed intake air that has passed through the water cooling unit 200 (S100); determining whether the temperature of the oil exceeds a preset first reference temperature (S200); determining, when the temperature of the oil exceeds the preset first reference temperature, whether the temperature of the compressed intake air exceeds a preset second reference temperature (S300); and operating the cooling water circulation pump 220 when the temperature of the compressed intake air exceeds the preset second reference temperature (S400).

The method of controlling the hybrid intercooler capable of controlling the oil temperature may further include interrupting the operation of the cooling circulation pump 220 when the temperature of the oil is less than the preset first reference temperature (S500). In particular, the first reference temperature may be a minimum temperature at which smooth lubrication is possible as the friction coefficient of oil (e.g., engine oil or transmission oil) is reduced. Although the first reference temperature may be set within a range from about 90 degrees Celsius to 110 degrees Celsius, the first reference temperature is not limited thereto, and the settings may be changed based on the intentions of the designer, the type of oil (e.g., the optimum temperature for the operation of oil), etc.

In the method of controlling the hybrid intercooler capable of adjusting the oil temperature, when the temperature of the compressed intake air is less than the second reference temperature the operation of the cooling circulation pump 220 may be executed. Particularly, the second reference temperature is the temperature of compressed intake air that is required, at the outlet of the hybrid intercooler system, for achieving the optimal power performance/fuel efficiency of the engine. The second reference temperature may be set within a range from about 35 degrees Celsius to 40 degrees Celsius for a gasoline engine, and within a range from about 45 degrees Celsius to 50 degrees Celsius for a diesel engine. However, the second reference temperature is not limited thereto, and the settings may be changed based on the intentions of the designer, the type of oil (e.g., the optimum temperature for the operation of oil), etc.

In particular, the present disclosure monitors the temperature of compressed intake air at the outlet of the hybrid intercooler system and determines whether to operate the cooling water circulation pump 220, thus maintaining the temperatures of the compressed intake air and oil within appropriate ranges. In other words, the present disclosure is provided to realize the rapid warm-up of oil (e.g., engine oil or transmission oil) while adjusting the temperature of compressed intake air at the outlet of the hybrid intercooler system.

Accordingly, when the temperature of oil is the first reference temperature or less or the temperature of compressed intake air is the second reference temperature or less, the operation of the cooling water circulation pump 220 may be interrupted to minimize circulation of the engine cooling water in the cooling water tank 210. In other words, the entire system may be operated to transmit heat to oil (e.g., engine oil or transmission oil) from the engine cooling water in the water cooling unit 200 that has absorbed heat from compressed intake air. Therefore, on the initial start-up, the rapid warm-up of the oil may be realized.

Furthermore, when the temperature of oil exceeds the first reference temperature and the temperature of the compressed intake air exceeds the second reference temperature, the cooling water circulation pump 220 may be operated to cool the compressed intake air. In other words, as the circulation of the engine cooling water in the cooling water tank 210 is maximized by operating the cooling water circulation pump 220, high-temperature engine cooling water that has absorbed the heat from compressed intake air may be discharged from the cooling water tank 210, and low-temperature engine cooling water that has been cooled by the radiator may be drawn into the cooling water tank 210 again. Consequently, the compressed intake air may be cooled and, simultaneously, the oil (e.g., engine oil or transmission oil) may be prevented from being excessively heated.

As described above, according to the present disclosure, rapid warm-up of oil may be implemented on initial start-up, and the temperature of the oil may be adjusted during driving to maintain the temperature of the oil within the optimum range. Consequently, the viscosity of the oil may be decreased, whereby the frictional resistance may be reduced. Accordingly, the fuel efficiency of the vehicle may be enhanced by approximately 1.7% or more. Furthermore, the present disclosure may substitute for the conventional ATF warmer and oil cooler, thus reducing the effort and cost of manufacturing a vehicle.

While the present disclosure has been described with respect to the specific exemplary embodiment, it will be apparent to those skilled in the art that various changes and modifications may be made without departing from the spirit and scope of the disclosure as defined in the following claims.

What is claimed is:
1. A hybrid intercooler system capable of adjusting an oil temperature, comprising:
an air cooling unit configured to exchange heat with external air passing through outer surfaces of a plurality of compressed intake air channels and cool compressed intake air passing through interiors of the compressed intake air channels;

a water cooling unit configured to exchange heat between engine cooling water enclosing the outer surfaces of the compressed intake air channels and the compressed intake air passing through the interiors of the compressed intake air channels and cool the compressed intake air; and an oil temperature controller configured to exchange heat between oil and the engine cooling water heated by the heat exchange performed by the water cooling unit and adjust the temperature of the oil, wherein the water cooling unit includes a cooling water tank, wherein the oil temperature controller includes an oil heat exchanger configured to exchange heat between heated engine cooling water and oil, wherein the oil heat exchanger includes a plurality of oil channels disposed inside the cooling water tank, and wherein heat is exchanged between engine cooling water enclosing outer surfaces of the oil channels and oil passing through interiors of the oil channels.

2. The hybrid intercooler system of claim 1, wherein the water cooling unit is disposed adjacent to an inlet of the compressed intake air channels.

3. The hybrid intercooler system of claim 1, wherein the water cooling unit is disposed adjacent to an outlet of the compressed intake air channels.

4. The hybrid intercooler system of claim 1, wherein the water cooling unit further includes:
a cooling water circulation pump configured to supply cooled engine cooling water to the cooling water tank.

5. The hybrid intercooler system of claim 4, wherein the water cooling unit further includes:
a cooling water inlet line configured to supply engine cooling water to the cooling water tank.

6. The hybrid intercooler system of claim 5, wherein the water cooling unit further includes:
a cooling water outlet line configured to discharge heat-exchanged engine cooling water from the cooling water tank.

7. The hybrid intercooler system of claim 1, wherein the oil heat exchanger is disposed between the compressed intake air channels and the cooling water tank.

8. The hybrid intercooler system of claim 1, wherein the oil temperature controller further includes:
an oil inlet line configured to supply oil to the oil heat exchanger.

9. The hybrid intercooler system of claim 8, wherein the oil temperature controller further includes:
an oil outlet line configured to discharge heat-exchanged oil from the oil exchanger.

10. The hybrid intercooler system of claim 9, wherein the oil heat exchanger includes:
an oil inlet unit that communicates with the oil inlet line and is configured to supply oil to the oil channels.

11. The hybrid intercooler system of claim 10, wherein the oil heat exchanger further includes:
an oil outlet unit that communicates with the oil outlet line and through which oil that has passed through the oil channels is discharged.

12. The hybrid intercooler system of claim 11, wherein the oil channels are arranged parallel to each other, and wherein the oil inlet unit and the oil outlet unit communicate with the oil channels (311) to cause flow rates of oil passing through the oil channels to be uniform with each other.

13. The hybrid intercooler system of claim 9, wherein the oil is engine oil, and wherein the oil inlet line and the oil outlet line communicate with an engine.

14. The hybrid intercooler system of claim 9, wherein the oil is transmission oil, and wherein the oil inlet line and the oil outlet line communicate with a transmission.

* * * * *